(12) United States Patent
Ephraim

(10) Patent No.: US 7,472,005 B2
(45) Date of Patent: Dec. 30, 2008

(54) AUXILIARY STEERING SYSTEM FOR VEHICLES

(76) Inventor: Ubon B. Ephraim, 4702 5th St. North West, Washington, DC (US) 20011

( * ) Notice: Subject to any disclaimer, the term of this patent is extended or adjusted under 35 U.S.C. 154(b) by 660 days.

(21) Appl. No.: 11/188,241

(22) Filed: Jul. 25, 2005

(65) Prior Publication Data

US 2007/0021888 A1 Jan. 25, 2007

(51) Int. Cl.
G06F 17/00 (2006.01)
G06F 19/00 (2006.01)
(52) U.S. Cl. .................. 701/41; 180/443; 180/234; 180/410; 180/408; 340/465; 116/31
(58) Field of Classification Search .................. 701/41, 701/43; 280/761; 180/234, 408, 410, 443; 340/465
See application file for complete search history.

(56) References Cited

U.S. PATENT DOCUMENTS

| | | | | |
|---|---|---|---|---|
| 2,181,907 A * | 12/1939 | Moffat et al. | ................ | 180/202 |
| 3,669,200 A * | 6/1972 | Odell | ................ | 180/204 |
| 4,221,273 A | 9/1980 | Finden | | |
| 4,683,973 A | 8/1987 | Honjo et al. | | |
| 4,810,229 A | 3/1989 | Shoji | | |
| 4,811,227 A | 3/1989 | Wikstrom | | |
| 4,823,899 A | 4/1989 | Ron | | |
| 4,944,360 A * | 7/1990 | Sturges | ................ | 180/210 |
| 5,816,354 A * | 10/1998 | Watkins | ................ | 180/209 |
| 5,924,512 A | 7/1999 | Wada | | |
| 6,367,407 B1 * | 4/2002 | DiGian, Jr. | ................ | 116/31 |
| 6,654,670 B2 * | 11/2003 | Kakinami et al. | ................ | 701/1 |
| 6,659,208 B2 * | 12/2003 | Gaffney et al. | ................ | 180/19.2 |
| 6,668,965 B2 * | 12/2003 | Strong | ................ | 180/411 |
| 6,728,615 B1 * | 4/2004 | Yao et al. | ................ | 701/41 |
| 6,942,058 B2 * | 9/2005 | Turner et al. | ................ | 180/446 |

(Continued)

FOREIGN PATENT DOCUMENTS

CA 1323865 C * 7/2007

(Continued)

OTHER PUBLICATIONS

Park by wire; Guvenc, L.; Control Systems Magazine, IEEE vol. 25, Issue 5, Oct. 2005 pp. 17-17 Digital Object Identifier 10.1109/MCS.2005.1512789.*

(Continued)

Primary Examiner—Cuong H Nguyen

(57) ABSTRACT

An auxiliary vehicle steering system includes a user interface for receiving a user input and transmitting a control output signal associated with the input signal. The interface is located within the vehicle. A mechanism is included for rotating a vehicle's front wheels along an arcuate path offset 90 degrees from equilibrium. The front wheel rotating mechanism includes grooved plates that have tapered outer edge portions extending along an outer perimeter thereof. A mechanism is included for rotating a vehicle's rear wheels along an arcuate path offset 90 degrees from equilibrium. The rear wheel rotating mechanism includes grooved plates that have tapered outer edge portions extending along an outer perimeter thereof. A controller is coupled to the interface that receives the control output signal and instructs the front wheel and the rear wheel rotating mechanisms to contemporaneously register the wheels orthogonal to the vehicle so that same can be laterally displaced.

15 Claims, 5 Drawing Sheets

U.S. PATENT DOCUMENTS

| | | | | |
|---|---|---|---|---|
| 7,017,685 | B2* | 3/2006 | Schoenberg | 180/2.1 |
| 7,295,227 | B1* | 11/2007 | Asahi et al. | 348/118 |
| 2002/0128750 | A1* | 9/2002 | Kakinami et al. | 701/1 |
| 2002/0174545 | A1* | 11/2002 | Strong | 16/110.1 |
| 2002/0175018 | A1* | 11/2002 | Strong | 180/412 |
| 2003/0132047 | A1* | 7/2003 | Gaffney et al. | 180/210 |
| 2005/0087388 | A1* | 4/2005 | Turner et al. | 180/446 |
| 2005/0207876 | A1* | 9/2005 | Springwater | 414/231 |
| 2006/0238284 | A1* | 10/2006 | Dimig et al. | 335/270 |
| 2006/0238285 | A1* | 10/2006 | Dimig et al. | 335/270 |
| 2007/0021888 | A1* | 1/2007 | Ephraim | 701/41 |

FOREIGN PATENT DOCUMENTS

| | | | |
|---|---|---|---|
| EP | 1160146 A2 | * | 10/2004 |
| EP | 1469422 A1 | * | 10/2004 |
| JP | 2004345528 A | * | 12/2004 |
| JP | 2007106194 A | * | 4/2007 |

OTHER PUBLICATIONS

Fuzzy Parking Manoeuvres of Wheeled Mobile Robots; Khoukhi, A.; Baron, L.; Balazinski, M.; North American Fuzzy Information Processing Society, 2007. NAFIPS '07. Annual Meeting of the Jun. 24-27, 2007 pp. 60-65; Digital Object identifier 10.1109/NAFIPS. 2007.383811.*

Automated Vehicle Mobile Guidance System for Parking Assistance; Hashimoto, N.; Kato, S.; Minobe, N.; Tsugawa, S.; Intelligent Vehicles Symposium, 2007 IEEE; Jun. 13-15, 2007 pp. 630-635; Digital Object Identifier 10.1109/IVS.2007.4290186.*

Minimum Parking Maneuvers for Articulated Vehicles with One-Axle Trailers; Zobel, D.; Balcerak, E.; Weidenfeller, T.; Control, Automation, Robotics and Vision, 2006. ICARCV '06. 9th International Conference on; Dec. 5-8, 2006 pp. 1-6 Digital Object Identifier 10.1109/ICARCV.2006.345243.*

Hardware/software approache for the FPGA implementation of a fuzzy logic controller; Masmoudi, M.S.; Insop Song; Karray, F.; Masmoudi, M.; Derbel, N.; Design and Test of Integrated Systems in Nanoscale Technology, 2006. DTIS 2006. International Conference on; 2006 pp. 419-423; Digital Object Identifier 10.1109/DTIS.2006. 1708690.*

Automatic parallel parking; Lo, Y.K.; Rad, A.B.; Wong, C.W.; Ho, M.L.; Intelligent Transportation Systems, 2003. Proceedings. 2003 IEEE; vol. 2, Oct. 12-15, 2003 pp. 1190-1193 vol. 2.*

Cell-phone guided vehicle, an application based on a drive-by-wire automated system; Kelber, C.R.; Dreger, R.S.; Gomes, G.K.; Webber, D.; Schirmbeck, J.; Netto, R.H.; Borges, D.A.; Intelligent Vehicles Symposium, 2003. Proceedings. IEEE; Jun. 9-11, 2003 pp. 645-649; Digital Object Identifier 10.1109/IVS.2003.1212988.*

Development of advanced parking assistance using human guidance; Wada, M.; Yoon, K.; Hashimoto, H.; Matsuda, S.; Advanced Intelligent Mechatronics, 1999. Proceedings. 1999 IEEE/ASME International Conference on; Sep. 19-23, 1999 pp. 997-1002; Digital Object Identifier 10.1109/AIM.1999.803308.*

Scanning Advanced Automobile Technology; Gharavi, H.; Prasad, K.V.; Ioannou, P.; Proceedings of the IEEE vol. 95, Issue 2, Feb. 2007 pp. 328-333.*

Optimal weight extraction for adaptive beamforming using systolic arrays; Tang, C.E.T.; Liu, K.J.R.; Tretter, S.A.; Aerospace and Electronic Systems, IEEE Transactions on; vol. 30, Issue 2, Apr. 1994 pp. 367-385; Digital Object Identifier 10.1109/7.272261.*

To Drive Is Human; Miller, I.; Garcia, E.; Campbell, M.; Computer vol. 39, Issue 12, Dec. 2006 pp. 52-56 Digital Object Identifier 10.1109/MC.2006.446.*

* cited by examiner

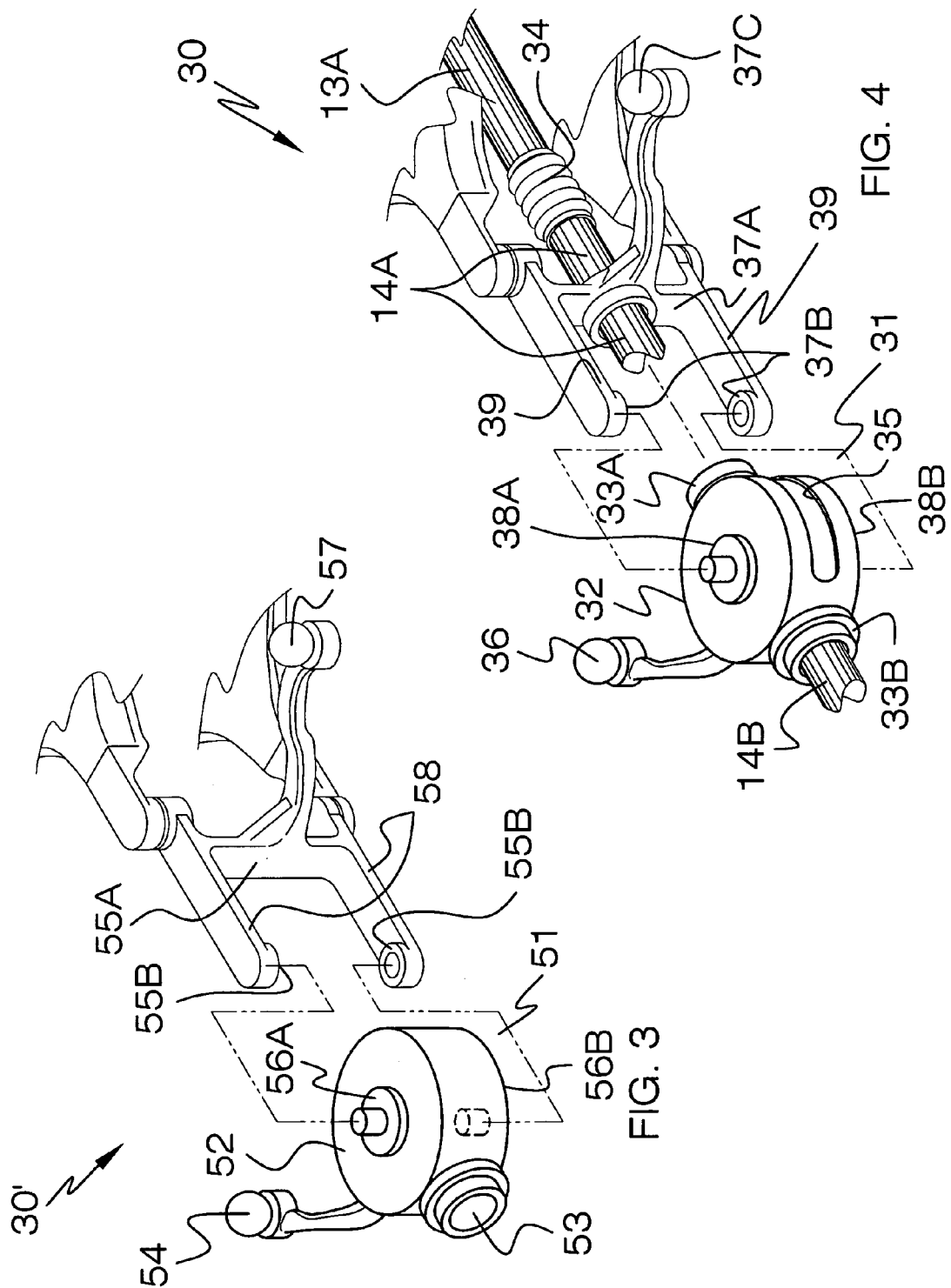

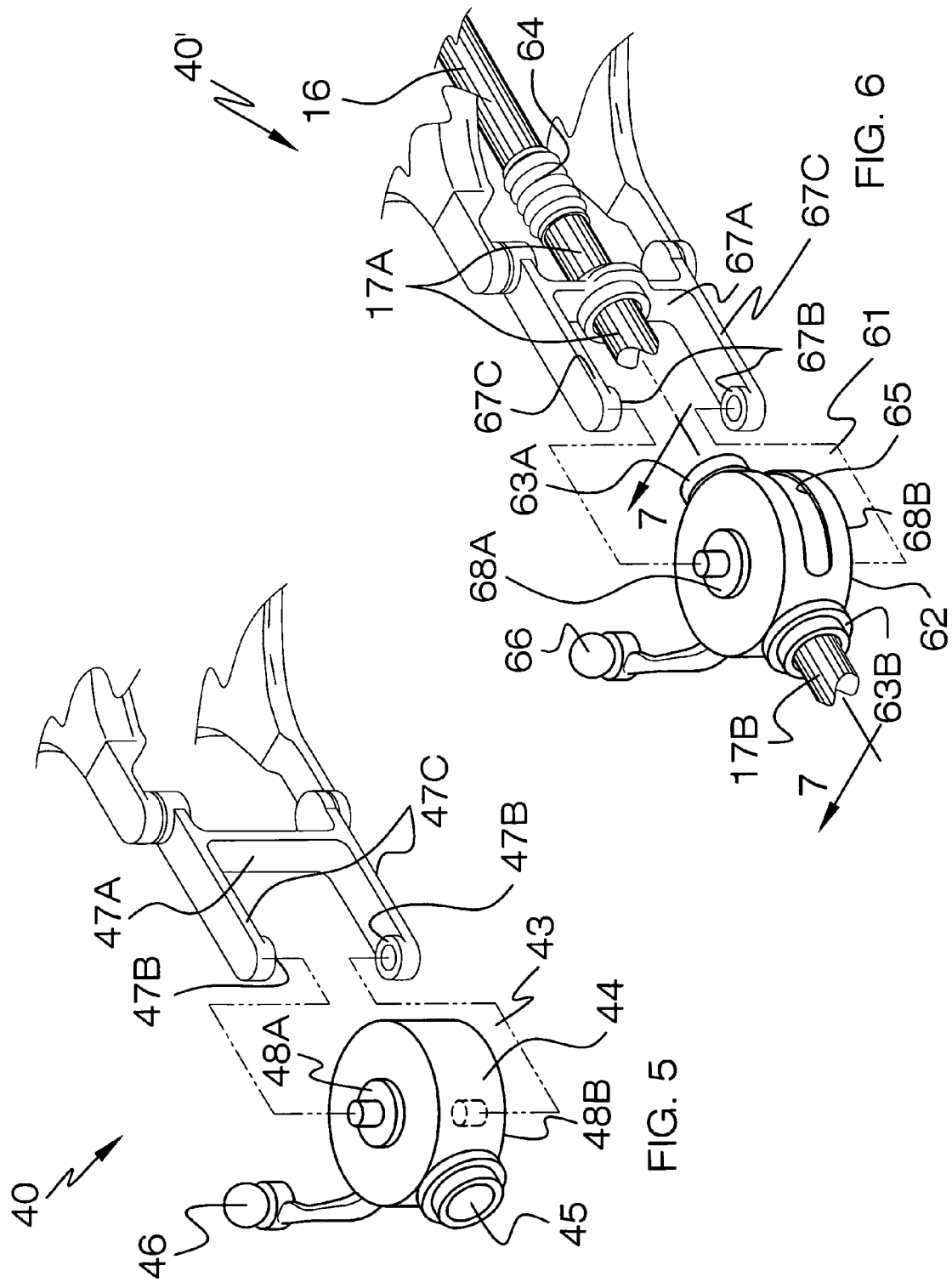

AUXILIARY STEERING SYSTEM FOR VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to steering systems and, more particularly, to an auxiliary steering system for vehicles for assisting a driver to laterally park a vehicle into space-limited areas.

2. Prior Art

Conventional vehicles with wheels are classified into two categories: automobile type vehicles, whose front or rear wheels are steered to change the direction in which vehicles travel, and omni-directional vehicles, whose wheels are all steered in a certain direction so that the vehicle can travel forward, backward, right, left, or diagonally without changing the vehicle position. The conventional automobile type vehicle has a larger turning radius, which leads to the difficulty one encounters when trying to maneuver and position such a vehicle into a limited area of space. This is especially true of instances when a driver is attempting to parallel park their vehicle. During this time consuming procedure, one must often maneuver the vehicle backwards and forwards a number of times, while running the risk of striking the cars parked fore and aft of the limited space.

Since the omni-directional vehicle can change direction without changing vehicle position or orientation, it is used in, for example, office robots, which must change direction and travel in the narrow spaces between desks. A conventional omni-directional vehicle can change direction by steering a plurality of wheels by independent steering mechanisms using special drive sources. The conventional omni-directional vehicle of this type has a steering motor for each wheel and is thus expensive. Since all the wheels must be simultaneously steered in a given direction, the steering motors must be synchronized. Synchronizing control devices are complicated and expensive.

Accordingly, a need remains for an auxiliary steering system for vehicles in order to overcome the above noted shortcomings. The present invention satisfies such a need by providing an auxiliary steering system that is easy to use, simple in design, and eliminates the frustrations associated with parallel parking. Instead of repeatedly traveling back and forth to maneuver a vehicle into a tight parking space on a congested street, such a system enables the vehicle to be driven laterally into the parking spot. This advantageously greatly reduces the possibility of accidentally bumping into other parked cars or stationary objects. The system is also easily adaptable to a variety of vehicles and can thus be employed by many vehicle manufacturers.

BRIEF SUMMARY OF THE INVENTION

In view of the foregoing background, it is therefore an object of the present invention to provide an auxiliary steering system for vehicles. These and other objects, features, and advantages of the invention are provided by an auxiliary vehicle steering system for advantageously assisting a driver to laterally park a vehicle into space-limited areas.

The auxiliary vehicle steering system includes a user interface for receiving a user input and transmitting a control output signal associated with the user input signal. Such a user interface is conveniently located within the vehicle, allowing for easy access thereto and quick activation of the system.

A mechanism is included for rotating a vehicle's front wheels along an arcuate path offset 90 degrees from equilibrium. Such a front wheel rotating mechanism includes a plurality of grooved plates that have tapered outer edge portions extending along an outer perimeter of the plates.

A mechanism is included for rotating a vehicle's rear wheels along an arcuate path offset 90 degrees from equilibrium such that the vehicle's front and rear wheels effectively align in sync and parallel to each other during operating conditions. Such a rear wheel rotating mechanism includes a plurality of grooved plates that have tapered outer edge portions extending along an outer perimeter of the plates.

A controller is electrically coupled to the user interface. Such a controller receives the control output signal and automatically instructs the front wheel rotating mechanism and the rear wheel rotating mechanism to contemporaneously register the front and rear wheels orthogonal to a longitudinal length of the vehicle so that the vehicle can advantageously and effectively be laterally displaced without moving along a longitudinal path.

In a preferred embodiment, the front wheel rotating mechanism is operably connected to a front wheel drive axle. Such a front wheel rotating mechanism preferably includes a pair of oppositely spaced and rotatable gear assemblies including a plurality of respective housings provided with diametrically opposed annular openings. The front wheel drive axle is medially situated between the gear assemblies and operably linked to the controller.

A pair of medially disposed driven axles are interfitted into selected ones of the housing openings. A pair of laterally disposed driven axles are interfitted into other ones of the housing openings.

A plurality of universal joints directly couple the laterally disposed driven axles to the front wheel drive axle. Such laterally disposed driven axles are detachable from the front wheel drive axle for advantageously and conveniently allowing an operator to retrofit the gear assemblies onto a variety of front wheel drive axles associated with a variety of vehicles. The laterally disposed driven axles are directly conjoined to associated wheel hubs of the vehicle respectively. The housings have an annular shape and are provided with an arcuate slot extending along a partial circumference of the housings respectively. Such housings further include a monolithically formed and outwardly protruding lever directly engaged with one of the driven axles such that the laterally disposed driven axles rotate along the arcuate path based upon the user input signal.

The front wheel rotating mechanism further includes a plurality of spindles including a pair of monolithically formed flange portions extending parallel to each other that are rotatably conjoined to the housings respectively. Such flange portions are directly connected to top and bottom surfaces of the housings and further are registered parallel to the front wheel drive axle. The spindles further include an outwardly protruding lever directly linked to one of the driven axles such that the one driven axle rotates along the arcuate path while the drive axle rotates along a rectilinear axis. The medially disposed driven axles are telescopically positioned through the spindles respectively.

A pair of arms are directly conjoined to the flange portions. Such arms are operably coupled to the controller in such a manner that the arms effectively cause the spindles to articulate the housings based upon the user input signal. The laterally disposed driven axles and the housings rotate in sync along the arcuate paths and thereby effectively displace associated ones of the vehicles wheels parallel to the longitudinal length of the front wheel drive axle.

In a preferred embodiment, the rear wheel rotating mechanism is operably connected to a rear driven axle of a front wheel drive vehicle. Such a rear wheel rotating mechanism preferably includes a pair of oppositely spaced and rotatable gear assemblies including a plurality of respective housings provided with diametrically opposed annular openings. The rear wheel drive axle is medially situated between the gear assemblies and operably linked to the controller. The housings include a monolithically formed and outwardly protruding lever operable linked to the rear driven axle.

A plurality of spindles including a pair of monolithically formed flange portions extend parallel to each other and are rotatably conjoined to the housings respectively. Such flange portions are directly connected to top and bottom surfaces of the housings and further are registered parallel to the rear driven axle of the front wheel drive vehicle.

A pair of arms are directly conjoined to the flange portions. Such arms are operably coupled to the controller in such a manner that the arms effectively cause the spindles to articulate the housings based upon the user input signal. Such housings rotate in sync along the arcuate paths and thereby effectively displace associated ones of the vehicle's wheels parallel to the longitudinal length of the rear driven axle of the front wheel drive vehicle.

In an alternate embodiment of the present invention, the front wheel rotating mechanism is operably connected to a front driven axle of a rear wheel drive vehicle. Such a front wheel rotating mechanism preferably includes a pair of oppositely spaced and rotatable gear assemblies including a plurality of respective housings provided with diametrically opposed annular openings. The front driven axle is medially situated between the gear assemblies and operably linked to the controller. The housings have an annular shape and include a monolithically formed and outwardly protruding lever operably linked to the controller.

A plurality of spindles including a pair of monolithically formed flange portions extend parallel to each other and are rotatably conjoined to the housings respectively. Such flange portions are directly connected to top and bottom surfaces of the housings and further are registered parallel to the front driven axle. The spindles further include an outwardly protruding lever operably linked to the controller.

A pair of arms are directly conjoined to the flange portions. Such arms are operably coupled to the controller in such a manner that the arms effectively cause the spindles to articulate the housings based upon the user input signal. The housings rotate in sync along the arcuate paths and thereby effectively displace associated ones of the vehicles wheels parallel to the longitudinal length of the front driven axle of the rear wheel drive vehicle.

Such an alternate embodiment further includes a rear wheel rotating mechanism that is operably connected to a rear wheel drive axle. The rear wheel rotating mechanism preferably includes a pair of oppositely spaced and rotatable gear assemblies including a plurality of respective housings provided with diametrically opposed annular openings. The rear wheel drive axle is medially situated between the gear assemblies and operably linked to the controller.

A pair of medially disposed driven axles are interfitted into selected ones of the housing openings. A pair of laterally disposed driven axles are interfitted into other ones of the housing openings.

A plurality of universal joints directly couple the laterally disposed driven axles to the rear wheel drive axle. Such laterally disposed driven axles are detachable from the rear wheel drive axle for advantageously and effectively allowing an operator to retrofit the gear assemblies onto a variety of rear wheel drive axles associated with a variety of vehicles. The laterally disposed driven axles are directly conjoined to an associated wheel hub of the vehicle respectively.

The housings have an annular shape and are provided with an arcuate slot extending along a partial circumference of the housings respectively. Such housings further include a monolithically formed and outwardly protruding lever directly engaged with one of the driven axles such that the laterally disposed driven axles rotate along the arcuate path based upon the user input signal.

A plurality of spindles include a pair of monolithically formed flange portions extending parallel to each other and rotatably conjoined to the housings respectively. Such flange portions are directly connected to top and bottom surfaces of the housings and further are registered parallel to the rear wheel drive axle. The medially disposed driven axles are telescopically positioned through the spindles respectively.

A pair of arms are directly conjoined to the flange portions. Such arms are operably coupled to the controller in such a manner that the arms cause the spindles to articulate the housings based upon the user input signal. The laterally disposed driven axles and the housings rotate in sync along the arcuate paths and thereby effectively displace associated ones of the vehicle's wheels parallel to the longitudinal length of the rear wheel drive axle.

There has thus been outlined, rather broadly, the more important features of-the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a partially exploded perspective view of the system shown in FIG. 1, showing the front wheel rotating mechanism of a rear wheel drive vehicle;

FIG. 4 is a partially exploded perspective view of the system shown in FIG. 2, showing the front wheel rotating mechanism of a front wheel drive vehicle;

FIG. 5 is a partially exploded perspective view of the system shown in FIG. 2, showing the rear wheel rotating mechanism of a front wheel drive vehicle;

FIG. 6 is a partially exploded perspective view of the system shown in FIG. 1, showing the rear wheel rotating mechanism of a rear wheel drive vehicle;

DETAILED DESCRIPTION OF THE INVENTION

Figure 2:
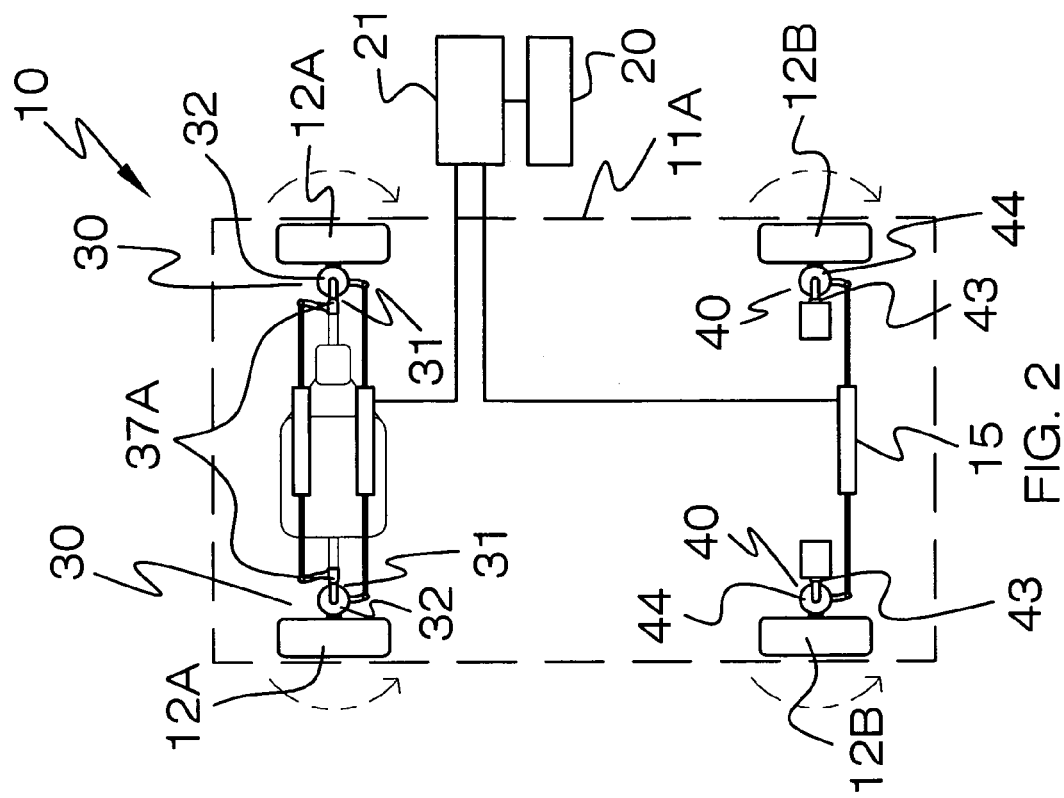
FIG. 2 is a top plan view showing a preferred embodiment for an auxiliary steering system for front wheel drive vehicles, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime numbers refer to alternate embodiments of such elements.

The system of this invention is referred to generally in FIGS. 1-9 by the reference numeral 10 and is intended to provide an auxiliary steering system for vehicles. It should be understood that the system 10 may be used to provide lateral movement of a vehicle in many different types of situations and should not be limited in use to only parallel parking situations.

Referring initially to FIG. 2, the auxiliary vehicle steering system 10 includes a user interface 20 that is essential for receiving a user input and transmitting a control output signal associated with the user input signal so that the system 10 only becomes activated at the desired time. Such a user interface 20 is conveniently located within the vehicle 11, which is critical and advantageously for allowing easy access thereto and quick activation of the system 10. Thus, a user does not have to exit their vehicle 11 and manually adjust any of the vehicle's wheels 12, which would be rather time consuming and physically tiring.

Figure 9:
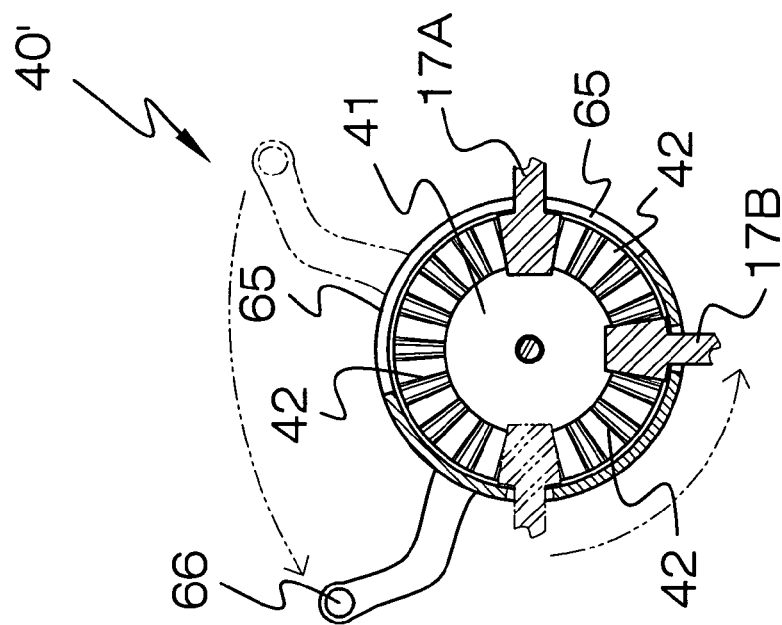
FIG. 9 is a cross-sectional view of the housing shown in FIG. 7, taken along line 8-8 and showing the lever at a second position.

Referring to FIGS. 2 and 4, a mechanism 30 is included for rotating a vehicle's front wheels 12A along an arcuate path offset 90 degrees from equilibrium. Such a front wheel rotating mechanism 30 includes a plurality of grooved plates 41 that have tapered outer edge portions 42 extending along an outer perimeter of the plates. The grooved plates 41 shown in FIGS. 8 and 9 are employed by all the housings 32, 44, 52 and 62 (described herein below) shown in FIGS. 1 through 7, as is obvious to a person of ordinary skill in the art.

Figure 7:
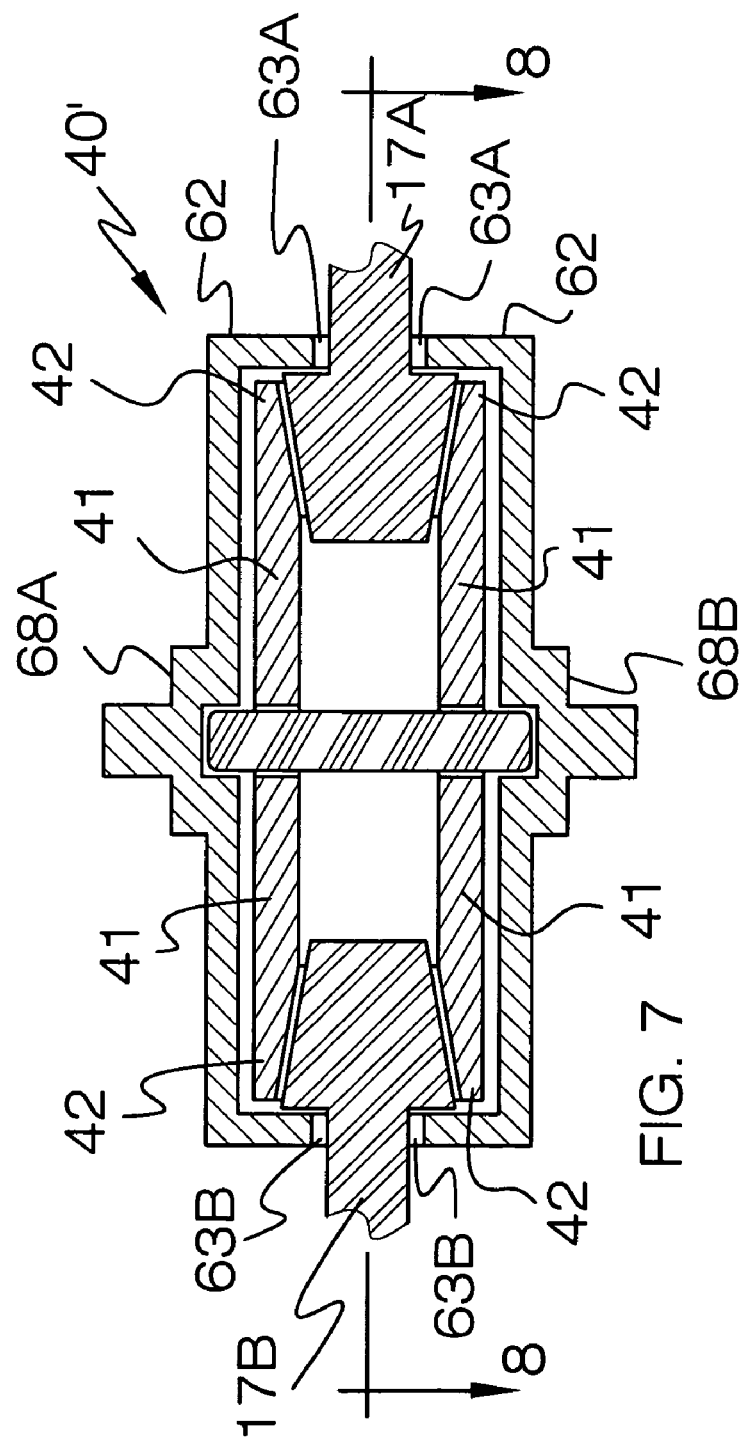
FIG. 7 is a cross-sectional view of the housing shown in FIG. 6, taken along line 7-7 and showing the grooved plates housed therein.
Figure 8:
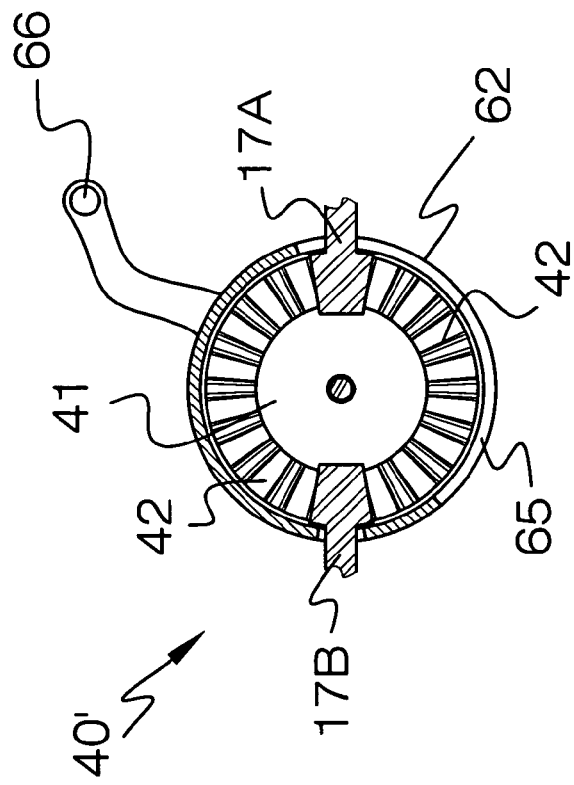
FIG. 8 is a cross-sectional view of the housing shown in FIG. 7, taken along line 8-8 and showing the lever at a first position.

Referring to FIGS. 2, and 6-9, a mechanism 40 is included for rotating a vehicle's rear wheels 12B along an arcuate path offset 90 degrees from equilibrium such that the vehicle's front 12A and rear wheels 12B effectively align in sync and parallel to each other during operating conditions. The 90 degree alignment of the vehicle's wheels 12 is crucial for allowing same to be laterally displaced with respect to a longitudinal length thereof. Such a rear wheel rotating mechanism 40 includes a plurality of grooved plates 41 that have tapered outer edge portions 42 extending along an outer perimeter of the plates 41, as is best shown in FIG. 7.

Referring to FIG. 2, a controller 21 is electrically coupled to the user interface 20. Such a controller 21 receives the control output signal and automatically instructs the front wheel rotating mechanism 30 and the rear wheel rotating mechanism 40 to contemporaneously register the front 12A and rear wheels 12B orthogonal to a longitudinal length of the vehicle 11A so that the vehicle 11A can advantageously and effectively be laterally displaced without moving along a longitudinal path. This feature advantageously allows a user to laterally displace their vehicle 11A into a limited amount of space where the conventional forward and backward motions employed during parallel parking are insufficient. Such a lateral displacement also conveniently and effectively eliminates the possibility of striking other vehicles positioned forward and aft of the vehicle 11A being laterally displaced, saving the driver a considerable amount of money and frustration. Such an auxiliary steering system 10 also allows a vehicle operator to more quickly park a vehicle 11A in a limited amount of space, thus advantageously preventing other motorists from waiting to long and becoming frustrated.

Referring to FIGS. 2 and 4, in a preferred embodiment 10, the front wheel rotating mechanism 30 is operably connected, with no intervening elements, to a front wheel drive axle 13A. Such a front wheel rotating mechanism 30 includes a pair of oppositely spaced and rotatable gear assemblies 31 including a plurality of respective housings 32 provided with diametrically opposed annular openings 33. The front wheel drive axle 13A is medially situated between the gear assemblies 31 and operably linked to the controller 21.

Again referring to FIGS. 2 and 4, a pair of medially disposed driven axles 14A are interfitted into selected ones 33A of the housing openings 33. A pair of laterally disposed driven axles 14B are interfitted into other ones 33B of the housing openings 33. This constructional layout is essential for connecting the wheels 12A to the drive axle 13A in such a manner that allows the wheels 12A to rotate normally under operating conditions, whether the system 10 is in an activated or deactivated state.

Referring to FIG. 4, a plurality of universal joints 34 directly couple, with no intervening elements, the medially disposed driven axles 14B to the front wheel drive axle 13A. Such laterally disposed driven axles 14B are detachable from the front wheel drive axle 13A for advantageously and conveniently allowing an operator to retrofit the gear assemblies 31 onto a variety of front wheel drive axles associated with a variety of vehicles 11A. This feature is essential for allowing the system 10 to be incorporated into already produced vehicles 11A as a convenient aftermarket accessory, and to be incorporated into newly produced vehicles 11A as a standard feature or a factory option. The laterally disposed driven axles 14B are directly conjoined, with no intervening elements, to associated wheel hubs (not shown) of the vehicle 11A respectively. The housings 32 have an annular shape and are provided with an arcuate slot 35 extending along a partial circumference of the housings 32 respectively. Such housings 32 further include a monolithically formed and outwardly protruding lever 36 directly engaged, with no intervening elements, with one of the driven axles 14 such that the laterally disposed driven axles 14B rotate along the arcuate path based upon the user input signal.

Again referring to FIG. 4, the front wheel rotating mechanism 30 further includes a plurality of spindles 37A including a pair of monolithically formed flange portions 37B extending parallel to each other and that are rotatably conjoined, with no intervening elements, to the housings 32 respectively. Such flange portions 37B are directly connected, with no intervening elements, to top 38A and bottom 38B surfaces of the housings 32 and further are registered parallel to the front wheel drive axle 13A. The spindles 37A further include an outwardly protruding lever 37C directly linked, with no intervening elements, to one of the driven axles 14 such that the one driven axle 14 rotates along the arcuate path while the drive axle 13A rotates along a rectilinear axis. The medially disposed driven axles 14A are telescopically positioned through the spindles 37A respectively.

Still referring to FIG. 4, a pair of arms 39 are directly conjoined, with no intervening elements, to the flange portions 37B. Such arms 39 are operably coupled to the controller 21 in such a manner that the arms 39 effectively cause the spindles 37A to articulate the housings 32 based upon the user input signal. The laterally disposed driven axles 14B and the housings 32 rotate in sync along the arcuate paths, which is vital to thereby effectively displace associated ones of the vehicle's wheels 12A parallel to the longitudinal length of the front wheel drive axle 13A.

Referring to FIGS. 2 and 5, in a preferred embodiment 10, the rear wheel rotating mechanism 40 is operably connected, with no intervening elements, to a rear driven axle 15 of a front wheel drive vehicle 11A. Such a rear wheel rotating mechanism 40 includes a pair of oppositely spaced and rotatable gear assemblies 43 including a plurality of respective housings 44 provided with diametrically opposed annular openings 45. The rear wheel drive axle 13B is medially situated between the gear assemblies 43 and operably linked to the controller 21. The housings 44 include a monolithically formed and outwardly protruding lever 46 operably linked to the rear driven axle 15.

Referring to FIG. 5, a plurality of spindles 47A including a pair of monolithically formed flange portions 47B extend parallel to each other and are rotatably conjoined to the housings 44 respectively. Such flange portions 47B are directly connected, with no intervening elements, to top 48A and bottom 48B surfaces of the housings 44 and further are registered parallel to the rear driven axle 15 of the front wheel drive vehicle 11A.

Still referring to FIG. 5, a pair of arms 47C are directly conjoined, with no intervening elements, to the flange portions 47B. Such arms 47C are operably coupled to the controller 21 in such a manner that the arms 47C effectively cause the spindles 47A to articulate the housings 44 based upon the user input signal. Such housings 44 rotate in sync along the arcuate paths and thereby effectively displace associated ones 12B of the vehicle's wheels 12 parallel to the longitudinal length of the rear driven axle 15 of the front wheel drive vehicle 11A.

Figure 1:
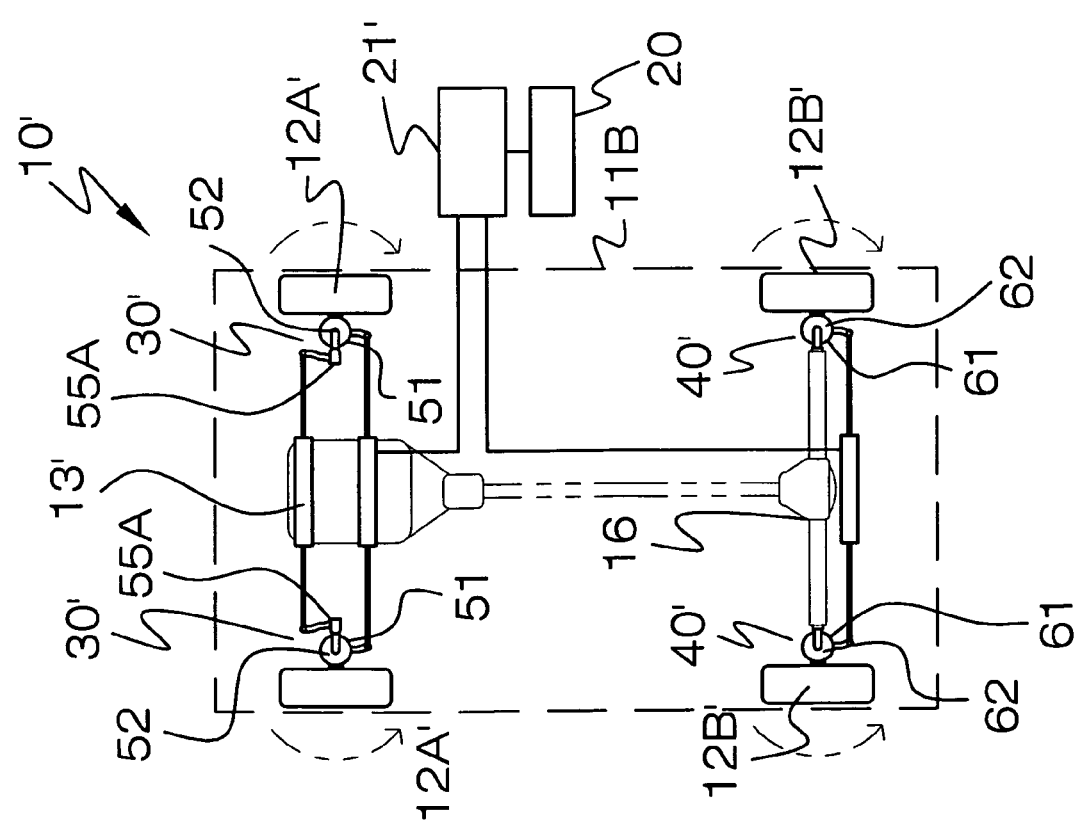
FIG. 1 is a top plan view showing an alternate embodiment for an auxiliary steering system for rear wheel drive vehicles, in accordance with the present invention.

Referring to FIGS. 1 and 3, in an alternate embodiment 10' of the present invention, the front wheel rotating mechanism 30' is operably connected, with no intervening elements, to a front driven axle 13' of a rear wheel drive vehicle 11B. Such a front wheel rotating mechanism 30' includes a pair of oppositely spaced and rotatable gear assemblies 51 including a plurality of respective housings 52 provided with diametrically opposed annular openings 53. The front driven axle 13' is medially situated between the gear assemblies 51 and operably linked to the controller 21'. The housings 52 further include a monolithically formed and outwardly protruding lever 54 operably linked to the controller 21'.

Still referring to FIG. 3, a plurality of spindles 55A including a pair of monolithically formed flange portions 55B extend parallel to each other and are rotatably conjoined to the housings 52 respectively. Such flange portions 55B are directly connected, with no intervening elements, to top 56A and bottom 56B surfaces of the housings 52 and further are registered parallel to the front driven axle 13'. The spindles 55A further include an outwardly protruding lever 57 operably linked to the controller 21'.

Again referring to FIG. 3, a pair of arms 58 are directly conjoined, with no intervening elements, to the flange portions 55B. Such arms 58 are operably coupled to the controller 21' in such a manner that the arms 58 effectively cause the spindles 55A to articulate the housings 52 based upon the user input signal. The housings 52 rotate in sync along the arcuate paths and thereby effectively displace associated ones of the vehicle's wheels 12A' parallel to the longitudinal length of the front driven axle 13' of the rear wheel drive vehicle 11B.

Referring to FIGS. 1 and 6-9, such an alternate embodiment 10' further includes a rear wheel rotating mechanism 40' that is operably connected, with no intervening elements, to a rear wheel drive axle 16. The rear wheel rotating mechanism 40' includes a pair of oppositely spaced and rotatable gear assemblies 61 including a plurality of respective housings 62 provided with diametrically opposed annular openings 63. The rear wheel drive axle 16 is medially situated between the gear assemblies 61 and operably linked to the controller 21'.

Referring to FIGS. 7 through 9, a pair of medially disposed driven axles 17A are interfitted into selected ones 63A of the housing openings 63. A pair of laterally disposed driven axles 17B are interfitted into other ones 63B of the housing openings 63. This constructional layout is essential for connecting-the wheels 12B' to the drive axle 16 in such a manner that allows the wheels 12' to rotate normally under operating conditions, whether the system 10 is in an activated or deactivated state.

Referring to FIG. 6, a plurality of universal joints 64 directly couple, with no intervening elements, the laterally disposed driven axles 17B to the rear wheel drive axle 16. Such laterally disposed driven axles 17B are detachable from the rear wheel drive axle 16, which is important and advantageous for effectively allowing an operator to retrofit the gear assemblies 61 onto a variety of rear wheel drive axles 16 associated with a variety of vehicles 11B. The laterally disposed driven axles 17B are directly conjoined, with no intervening elements, to an associated wheel hub (not shown) of the vehicle 11B respectively, such that the rear wheels 12B' can effectively rotate-in sync with the laterally disposed driven axles 17B'.

Referring to FIGS. 1 and 6-9, the housings 62 have an annular shape and are provided with an arcuate slot 65 extending along a partial circumference of the housings 62 respectively. Such housings 62 further include a monolithically formed and outwardly protruding lever 66 directly engaged, with no intervening elements, with one of the driven axles 17 such that the laterally disposed driven axles 17B rotate along the arcuate path based upon the user input signal.

Referring to FIG. 6, a plurality of spindles 67A including a pair of monolithically formed flange portions 67B extend parallel to each other and are rotatably conjoined to the housings 62 respectively. Such flange portions 67B are directly connected, with no intervening elements, to top 68A and bottom 68B surfaces of the housings 62 and further are registered parallel to the rear wheel drive axle 16. The medially disposed driven axles 17A are telescopically positioned through the spindles 67A respectively.

Still referring to FIG. 6, a pair of arms 67C are directly conjoined, with no intervening elements, to the flange portions 67B. Such arms 67C are operably coupled to the controller 21' in such a manner that the arms 67C cause the spindles 67A to articulate the housings 62 based upon the user input signal. The laterally disposed driven axles 17B and the housings 62 rotate in sync along the arcuate paths and thereby effectively displace associated ones 12B' of the vehicle's wheels 12' parallel to the longitudinal length of the rear wheel drive axle 16.

In use, when a driver is confronted with a small parking space that requires complicated maneuvering of the vehicle to enter, they can simply activate the system 10 through the user interface 20 located in the vehicle 11. This effectively causes all four of the vehicle's wheels 12 to simultaneously rotate 90 degrees within the wheel bay. Thus, a vehicle operator can simply drive the car into the parking spot in a lateral fashion. This process consumes much less time than attempting to parallel park the vehicle 11 under similar conditions. Chances of striking another vehicle or stationary objected located fore and aft of the car are also advantageously reduced by using the system 10.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

The invention claimed is:

1. An auxiliary vehicle steering system for assisting a driver to laterally park a vehicle into space-limited areas, said auxiliary vehicle steering system comprising:
   a user interface for receiving a user input and transmitting a control output signal associated with said user input signal, said user interface being located within the vehicle;
   means for rotating a vehicle's front wheels along an arcuate path offset 90 degrees from equilibrium;
   means for rotating a vehicle's rear wheels along an arcuate path offset 90 degrees from equilibrium such that the vehicle's front and rear wheels align in sync and parallel to each other during operating conditions; and
   a controller electrically coupled to said user interface, said controller receiving said control output signal and automatically instructing said front wheel rotating means and said rear wheel rotating means to contemporaneously register the front and rear wheels orthogonal to a longitudinal length of the vehicle so that the vehicle can be laterally displaced without moving along a longitudinal path.

2. The system of claim 1, wherein said front wheel rotating means is operably connected to a front wheel drive axle, said front wheel rotating means comprising:
   a pair of oppositely spaced and rotatable gear assemblies including a plurality of respective housings provided with diametrically opposed annular openings, the front wheel drive axle being medially situated between said gear assemblies and operably linked to said controller;
   a pair of medially disposed driven axles interfitted into selected ones of said housing openings;
   a pair of laterally disposed driven axles interfitted into other ones of said housing openings;
   a plurality of universal joints directly coupling said laterally disposed driven axles to the front wheel drive axle, said laterally disposed driven axles being detachable from the front wheel drive axle for allowing an operator to retrofit said gear assemblies onto a variety of front wheel drive axles associated with a variety of vehicles;
   wherein said laterally disposed driven axles are directly conjoined to an associated wheel hub of the vehicle respectively, said housings having an annular shape and being provided with an arcuate slot extending along a partial circumference of said housings respectively, wherein said housings further include a monolithically formed and outwardly protruding lever directly engaged with one said driven axles such that said laterally disposed driven axles rotate along said arcuate path based upon said user input signal;
   a plurality of spindles including a pair of monolithically formed flange portions extending parallel to each other and rotatably conjoined to said housings respectively, said flange portions being directly connected to top and bottom surfaces of said housings and further being registered parallel to the front wheel drive axle, said spindles further including an outwardly protruding lever directly linked to one said driven axles such that said one driven axle rotates along said arcuate path while said drive axle rotates along a rectilinear axis, said medially disposed driven axles being telescopically positioned through said spindles respectively; and
   a pair of arms directly conjoined to said flange portions, said arms being operably coupled to said controller in such a manner that said arms cause said spindles to articulate said housings based upon said user input signal;
   wherein said laterally disposed driven axles and said housings rotate in sync along said arcuate paths and thereby displace associated ones of the vehicle's wheels parallel to the longitudinal length of the front wheel drive axle.

3. The system of claim 1, wherein said rear wheel rotating means is operably connected to a rear driven axle of a front wheel drive vehicle, said rear wheel rotating means comprising:
   a pair of oppositely spaced and rotatable gear assemblies including a plurality of respective housings provided with diametrically opposed annular openings, the rear wheel drive axle being medially situated between said gear assemblies and operably linked to said controller;
   wherein said housings include a monolithically formed and outwardly protruding lever operably linked to the rear driven axle;
   a plurality of spindles including a pair of monolithically formed flange portions extending parallel to each other and rotatably conjoined to said housings respectively, said flange portions being directly connected to top and bottom surfaces of said housings and further being registered parallel to the rear driven axle of the front wheel drive vehicle; and
   a pair of arms directly conjoined to said flange portions, said arms being operably coupled to said controller in such a manner that said arms cause said spindles to articulate said housings based upon said user input signal;

wherein said housings rotate in sync along said arcuate paths and thereby displace associated ones of the vehicle's wheels parallel to the longitudinal length of the rear driven axle of the front wheel drive vehicle.

4. The system of claim 1, wherein said front wheel rotating means is operably connected to a front driven axle of a rear wheel drive vehicle, said front wheel rotating means comprising:

a pair of oppositely spaced and rotatable gear assemblies including a plurality of respective housings provided with diametrically opposed annular openings, the front driven axle being medially situated between said gear assemblies and operably linked to said controller;

said housings having an annular shape and including a monolithically formed and outwardly protruding lever operably linked to said controller;

a plurality of spindles including a pair of monolithically formed flange portions extending parallel to each other and rotatably conjoined to said housings respectively, said flange portions being directly connected to top and bottom surfaces of said housings and further being registered parallel to the front driven axle, said spindles further including an outwardly protruding lever operably linked to said controller; and a pair of arms directly conjoined to said flange portions, said arms being operably coupled to said controller in such a manner that said arms cause said spindles to articulate said housings based upon said user input signal;

wherein said housings rotate in sync along said arcuate paths and thereby displace associated ones of the vehicle's wheels parallel to the longitudinal length of the front driven axle of the rear wheel drive vehicle.

5. The system of claim 1, wherein said rear wheel rotating means is operably connected to a rear wheel drive axle, said rear wheel rotating means comprising:

a pair of oppositely spaced and rotatable gear assemblies including a plurality of respective housings provided with diametrically opposed annular openings, the rear wheel drive axle being medially situated between said gear assemblies and operably linked to said controller;

a pair of medially disposed driven axles interfitted into selected ones of said housing openings;

a pair of laterally disposed driven axles interfitted into other ones of said housing openings;

a plurality of universal joints directly coupling said laterally disposed driven axles to the rear wheel drive axle, said laterally disposed driven axles being detachable from the rear wheel drive axle for allowing an operator to retrofit said gear assemblies onto a variety of rear wheel drive axles associated with a variety of vehicles; p1 wherein said laterally disposed driven axles are directly conjoined to an associated wheel hub of the vehicle respectively, said housings having an annular shape and being provided with an arcuate slot extending along a partial circumference of said housings respectively, wherein said housings further include a monolithically formed and outwardly protruding lever directly engaged with one said driven axles such that said laterally disposed driven axles rotate along said arcuate path based upon said user input signal;

a plurality of spindles including a pair of monolithically formed flange portions extending parallel to each other and rotatably conjoined to said housings respectively, said flange portions being directly connected to top and bottom surfaces of said housings and further being registered parallel to the rear wheel drive axle, said medially disposed driven axles being telescopically positioned through said spindles respectively; and a pair of arms directly conjoined to said flange portions, said arms being operably coupled to said controller in such a manner that said arms cause said spindles to articulate said housings based upon said user input signal;

wherein said laterally disposed driven axles and said housings rotate in sync along said arcuate paths and thereby displace associated ones of the vehicle's wheels parallel to the longitudinal length of the rear wheel drive axle.

6. An auxiliary vehicle steering system for assisting a driver to laterally park a vehicle into space-limited areas, said auxiliary vehicle steering system comprising:

a user interface for receiving a user input and transmitting a control output signal associated with said user input signal, said user interface being located within the vehicle;

means for rotating a vehicle's front wheels along an arcuate path offset 90 degrees from equilibrium, said front wheel rotating means comprising a plurality of grooved plates having tapered outer edge portions extending along an outer perimeter of said plates;

means for rotating a vehicle's rear wheels along an arcuate path offset 90 degrees from equilibrium such that the vehicle's front and rear wheels align in sync and parallel to each other during operating conditions; and a controller electrically coupled to said user interface, said controller receiving said control output signal and automatically instructing said front wheel rotating means and said rear wheel rotating means to contemporaneously register the front and rear wheels orthogonal to a longitudinal length of the vehicle so that the vehicle can be laterally displaced without moving along a longitudinal path.

7. The system of claim 6, wherein said front wheel rotating means is operably connected to a front wheel drive axle, said front wheel rotating means comprising:

a pair of oppositely spaced and rotatable gear assemblies including a plurality of respective housings provided with diametrically opposed annular openings, the front wheel drive axle being medially situated between said gear assemblies and operably linked to said controller;

a pair of medially disposed driven axles interfitted into selected ones of said housing openings;

a pair of laterally disposed driven axles interfitted into other ones of said housing openings;

a plurality of universal joints directly coupling said laterally disposed driven axles to the front wheel drive axle, said laterally disposed driven axles being detachable from the front wheel drive axle for allowing an operator to retrofit said gear assemblies onto a variety of front wheel drive axles associated with a variety of vehicles;

wherein said laterally disposed driven axles are directly conjoined to an associated wheel hub of the vehicle respectively, said housings having an annular shape and being provided with an arcuate slot extending along a partial circumference of said housings respectively, wherein said housings further include a monolithically formed and outwardly protruding lever directly engaged with one said driven axles such that said laterally disposed driven axles rotate along said arcuate path based upon said user input signal;

a plurality of spindles including a pair of monolithically formed flange portions extending parallel to each other and rotatably conjoined to said housings respectively, said flange portions being directly connected to top and bottom surfaces of said housings and further being registered parallel to the front wheel drive axle, said spindles further including an outwardly protruding lever directly linked to one said driven axles such that said one driven axle rotates along said arcuate path while said drive axle rotates along a rectilinear axis, said medially disposed driven axles being telescopically positioned through said spindles respectively; and a pair of arms directly conjoined to said flange portions, said arms being operably coupled to said controller in such a manner that said arms cause said spindles to articulate said housings based upon said user input signal;

wherein said laterally disposed driven axles and said housings rotate in sync along said arcuate paths and thereby displace associated ones of the vehicle's wheels parallel to the longitudinal length of the front wheel drive axle.

8. The system of claim 6, wherein said rear wheel rotating means is operably connected to a rear driven axle of a front wheel drive vehicle, said rear wheel rotating means comprising:

a pair of oppositely spaced and rotatable gear assemblies including a plurality of respective housings provided with diametrically opposed annular openings, the rear wheel drive axle being medially situated between said gear assemblies and operably linked to said controller;

wherein said housings include a monolithically formed and outwardly protruding lever operable linked to the rear driven axle;

a plurality of spindles including a pair of monolithically formed flange portions extending parallel to each other and rotatably conjoined to said housings respectively, said flange portions being directly connected to top and bottom surfaces of said housings and further being registered parallel to the rear driven axle of the front wheel drive vehicle; and a pair of arms directly conjoined to said flange portions, said arms being operably coupled to said controller in such a manner that said arms cause said spindles to articulate said housings based upon said user input signal;

wherein said housings rotate in sync along said arcuate paths and thereby displace associated ones of the vehicle's wheels parallel to the longitudinal length of the rear driven axle of the front wheel drive vehicle.

9. The system of claim 6, wherein said front wheel rotating means is operably connected to a front driven axle of a rear wheel drive vehicle, said front wheel rotating means comprising:

a pair of oppositely spaced and rotatable gear assemblies including a plurality of respective housings provided with diametrically opposed annular openings, the front driven axle being medially situated between said gear assemblies and operably linked to said controller;

said housings having an annular shape and including a monolithically formed and outwardly protruding lever operably linked to said controller;

a plurality of spindles including a pair of monolithically formed flange portions extending parallel to each other and rotatably conjoined to said housings respectively, said flange portions being directly connected to top and bottom surfaces of said housings and further being registered parallel to the front driven axle, said spindles further including an outwardly protruding lever operably linked to said controller; and a pair of arms directly conjoined to said flange portions, said arms being operably coupled to said controller in such a manner that said arms cause said spindles to articulate said housings based upon said user input signal;

wherein said housings rotate in sync along said arcuate paths and thereby displace associated ones of the vehicle's wheels parallel to the longitudinal length of the front driven axle of the rear wheel drive vehicle.

10. The system of claim 6, wherein said rear wheel rotating means is operably connected to a rear wheel drive axle, said rear wheel rotating means comprising:

a pair of oppositely spaced and rotatable gear assemblies including a plurality of respective housings provided with diametrically opposed annular openings, the rear wheel drive axle being medially situated between said gear assemblies and operably linked to said controller;

a pair of medially disposed driven axles interfitted into selected ones of said housing openings;

a pair of laterally disposed driven axles interfitted into other ones of said housing openings;

a plurality of universal joints directly coupling said laterally disposed driven axles to the rear wheel drive axle, said laterally disposed driven axles being detachable from the rear wheel drive axle for allowing an operator to retrofit said gear assemblies onto a variety of rear wheel drive axles associated with a variety of vehicles;

wherein said laterally disposed driven axles are directly conjoined to an associated wheel hub of the vehicle respectively, said housings having an annular shape and being provided with an arcuate slot extending along a partial circumference of said housings respectively, wherein said housings further include a monolithically formed and outwardly protruding lever directly engaged with one said driven axles such that said laterally disposed driven axles rotate along said arcuate path based upon said user input signal;

a plurality of spindles including a pair of monolithically formed flange portions extending parallel to each other and rotatably conjoined to said housings respectively, said flange portions being directly connected to top and bottom surfaces of said housings and further being registered parallel to the rear wheel drive axle, said medially disposed driven axles being telescopically positioned through said spindles respectively; and a pair of arms directly conjoined to said flange portions, said arms being operably coupled to said controller in such a manner that said arms cause said spindles to articulate said housings based upon said user input signal;

wherein said laterally disposed driven axles and said housings rotate in sync along said arcuate paths and thereby displace associated ones of the vehicle's wheels parallel to the longitudinal length of the rear wheel drive axle.

11. An auxiliary vehicle steering system for assisting a driver to laterally park a vehicle into space-limited areas, said auxiliary vehicle steering system comprising:

a user interface for receiving a user input and transmitting a control output signal associated with said user input signal, said user interface being located within the vehicle;

means for rotating a vehicle's front wheels along an arcuate path offset 90 degrees from equilibrium, said front wheel rotating means comprising a plurality of grooved plates having tapered outer edge portions extending along an outer perimeter of said plates;

means for rotating a vehicle's rear wheels along an arcuate path offset 90 degrees from equilibrium such that the vehicle's front and rear wheels align in sync and parallel to each other during operating conditions, said rear wheel rotating means comprising a plurality of grooved plates having tapered outer edge portions extending along an outer perimeter of said plates; and a controller electrically coupled to said user interface, said controller receiving said control output signal and automatically instructing said front wheel rotating means and said rear wheel rotating means to contemporaneously register the front and rear wheels orthogonal to a longitudinal length of the vehicle so that the vehicle can be laterally displaced without moving along a longitudinal path.

12. The system of claim 11, wherein said front wheel rotating means is operably connected to a front wheel drive axle, said front wheel rotating means comprising:

a pair of oppositely spaced and rotatable gear assemblies including a plurality of respective housings provided with diametrically opposed annular openings, the front wheel drive axle being medially situated between said gear assemblies and operably linked to said controller;

a pair of medially disposed driven axles interfitted into selected ones of said housing openings;

a pair of laterally disposed driven axles interfitted into other ones of said housing openings;

a plurality of universal joints directly coupling said laterally disposed driven axles to the front wheel drive axle, said laterally disposed driven axles being detachable from the front wheel drive axle for allowing an operator to retrofit said gear assemblies onto a variety of front wheel drive axles associated with a variety of vehicles;

wherein said laterally disposed driven axles are directly conjoined to an associated wheel hub of the vehicle respectively, said housings having an annular shape and being provided with an arcuate slot extending along a partial circumference of said housings respectively, wherein said housings further include a monolithically formed and outwardly protruding lever directly engaged with one said driven axles such that said laterally disposed driven axles rotate along said arcuate path based upon said user input signal;

a plurality of spindles including a pair of monolithically formed flange portions extending parallel to each other and rotatably conjoined to said housings respectively, said flange portions being directly connected to top and bottom surfaces of said housings and further being registered parallel to the front wheel drive axle, said spindles further including an outwardly protruding lever directly linked to one said driven axles such that said one driven axle rotates along said arcuate path while said drive axle rotates along a rectilinear axis, said medially disposed driven axles being telescopically positioned through said spindles respectively; and a pair of arms directly conjoined to said flange portions, said arms being operably coupled to said controller in such a manner that said arms cause said spindles to articulate said housings based upon said user input signal;

wherein said laterally disposed driven axles and said housings rotate in sync along said arcuate paths and thereby displace associated ones of the vehicle's wheels parallel to the longitudinal length of the front wheel drive axle.

13. The system of claim 11, wherein said rear wheel rotating means is operably connected to a rear driven axle of a front wheel drive vehicle, said rear wheel rotating means comprising:

a pair of oppositely spaced and rotatable gear assemblies including a plurality of respective housings provided with diametrically opposed annular openings, the rear wheel drive axle being medially situated between said gear assemblies and operably linked to said controller;

wherein said housings include a monolithically formed and outwardly protruding lever operable linked to the rear driven axle;

a plurality of spindles including a pair of monolithically formed flange portions extending parallel to each other and rotatably conjoined to said housings respectively, said flange portions being directly connected to top and bottom surfaces of said housings and further being registered parallel to the rear driven axle of the front wheel drive vehicle; and a pair of arms directly conjoined to said flange portions, said arms being operably coupled to said controller in such a manner that said arms cause said spindles to articulate said housings based upon said user input signal;

wherein said housings rotate in sync along said arcuate paths and thereby displace associated ones of the vehicles wheels parallel to the longitudinal length of the rear driven axle of the front wheel drive vehicle.

14. The system of claim 11, wherein said front wheel rotating means is operably connected to a front driven axle of a rear wheel drive vehicle, said front wheel rotating means comprising:

a pair of oppositely spaced and rotatable gear assemblies including a plurality of respective housings provided with diametrically opposed annular openings, the front driven axle being medially situated between said gear assemblies and operably linked to said controller;

said housings having an annular shape and including a monolithically formed and outwardly protruding lever operably linked to said controller;

a plurality of spindles including a pair of monolithically formed flange portions extending parallel to each other and rotatably conjoined to said housings respectively, said flange portions being directly connected to top and bottom surfaces of said housings and further being registered parallel to the front driven axle, said spindles further including an outwardly protruding lever operably linked to said controller; and a pair of arms directly conjoined to said flange portions, said arms being operably coupled to said controller in such a manner that said arms cause said spindles to articulate said housings based upon said user input signal;

wherein said housings rotate in sync along said arcuate paths and thereby displace associated ones of the vehicle's wheels parallel to the longitudinal length of the front driven axle of the rear wheel drive vehicle.

15. The system of claim 11, wherein said rear wheel rotating means is operably connected to a rear wheel drive axle, said rear wheel rotating means comprising:

a pair of oppositely spaced and rotatable gear assemblies including a plurality of respective housings provided with diametrically opposed annular openings, the rear wheel drive axle being medially situated between said gear assemblies and operably linked to said controller;

a pair of medially disposed driven axles interfitted into selected ones of said housing openings;

a pair of laterally disposed driven axles interfitted into other ones of said housing openings;

a plurality of universal joints directly coupling said laterally disposed driven axles to the rear wheel drive axle, said laterally disposed driven axles being detachable from the rear wheel drive axle for allowing an operator to retrofit said gear assemblies onto a variety of rear wheel drive axles associated with a variety of vehicles;

wherein said laterally disposed driven axles are directly conjoined to an associated wheel hubs of the vehicle respectively, said housings having an annular shape and being provided with an arcuate slot extending along a partial circumference of said housings respectively, wherein said housings further include a monolithically formed and outwardly protruding lever directly engaged with one said driven axles such that said laterally disposed driven axles rotate along said arcuate path based upon said user input signal;

a plurality of spindles including a pair of monolithically formed flange portions extending parallel to each other and rotatably conjoined to said housings respectively, said flange portions being directly connected to top and bottom surfaces of said housings and further being registered parallel to the rear wheel drive axle, said medially disposed driven axles being telescopically positioned through said spindles respectively; and a pair of arms directly conjoined to said flange portions, said arms being operably coupled to said controller in such a manner that said arms cause said spindles to articulate said housings based upon said user input signal;

wherein said laterally disposed driven axles and said housings rotate in sync along said arcuate paths and thereby displace associated ones of the vehicle's wheels parallel to the longitudinal length of the rear wheel drive axle.

* * * * *